Patented Nov. 14, 1950

2,529,520

UNITED STATES PATENT OFFICE 2,529,520

LOW-TEMPERATURE POLYMERIZATION PROCESS FOR UNSATURATES

William J. Sparks, Westfield, and John D. Garber, Cranford, N. J., assignors to Standard Oil Development Company, a corporation of Delaware No Drawing. Application July 8, 1946, Serial No. 682,145

6 Claims. (Cl. 260—85.3)

This application relates to low temperature olefinic polymerization; relates particularly to the low temperature polymerization of mixed olefinic material, and relates especially to diluent mixtures for low temperature polymerization to avoid adhesion of the polymer to the reactor surfaces and cohesion of polymer agglomerates.

It has been found possible to produce a copolymer which is an excellent replacement for natural rubber or caoutchouc, by the steps of mixing together a major proportion of isobutylene and a minor proportion of a multiolefin and copolymerizing them at a temperature within the range about $-40°$ C. and $-103°$ C. by the application to the cold olefinic material of a Friedel-Crafts type catalyst, preferably in solution in a low-freezing, non-complex-forming solvent. In this reaction it has been found that a superior material is produced by polymerizing the olefinic mixture in the presence of a diluent or diluent-refrigerant, but great difficulty has been experienced in carrying out the reaction because of the tendency for portions of the polymer to precipitate on and adhere to the walls of the reactor and the stirring propeller and drive shaft until the polymerization reactor is plugged to such an extent that circulation cannot occur, and the stirrer is so enwrapped in layers of polymer that it ceases to function; since the polymer is tough and elastic and removable only with the greatest difficulty. It is difficult to scrape off and just about as difficult to dissolve; and, in addition, a dissolving step requires an unreasonable amount of solvent.

It has been suggested that the polymer be prepared in a diluent which is a solvent for the polymer, in order that no solid polymer be thrown out. However, this procedure is unsatisfactory because of the extremely high viscosity of polymer solutions containing even small amounts of dissolved polymer, and the very large amount of solvent which must be handled over and over again in the making of the polymer. Attempts have also been made to find a diluent which, in admixture with the polymerizable olefins, would yield a homogeneous mixture and which would convert the mixture as a whole into a non-solvent for the polymer produced, in spite of the high solvent power of the monomers for the polymer, in order to cause precipitation of the polymer immediately upon formation in a dense granular form so that it did not adhere to the reactor nor to the stirring equipment, and did not increase the viscosity of the polymerization mixture. To the present, however, no such diluent has been found, and the necessary presence of unpolymerized olefins during the polymerization reaction probably prevents any material from acting as a complete non-solvent. There are available, however, some substances which alone are non-solvents for the polymers and do not interfere with the polymerizable olefins nor the polymerization catalyst, yet serve to reduce considerably the solvent power of the monomer mixture for the polymer, and if a sufficiently high proportion of these materials are used in the reaction mixture most of the polymers can be precipitated out. However, some polymer remains in solution and as additional polymer forms, a considerable portion is precipitated on the inner surfaces of the reactor and adheres thereto very strongly as above outlined.

According to the present invention, it is found that if a proper adjustment is made with respect to the amount of non-solvent, olefin and solvent, a solid polymer can be produced which is "solvated" sufficiently to destroy its adhesive power, but is not in solution to such an extent as to raise the viscosity unduly. Accordingly, polymerization may be conducted to any desired extent without yielding a mixture which is too thick to flow or handle, and at the same time the stickiness and adhesiveness of the polymer are so slight that it is readily removed from the reactor walls and stirring equipment merely by the agitation ordinarily produced by the customary stirrer.

Thus the invention mixes together a major proportion of isobutylene, preferably from 70% to 99%, with a minor proportion of a multiolefin, preferably from 30% to 1%, the multiolefin having more than one carbon to carbon double linkage per molecule and from 4 to 14 carbon atoms per molecule, cooling the mixture to a temperature within the range between $-40°$ C. and $-164°$ C., preferably between $-40°$ C. and $-103°$ C., and diluting the material with a sufficient amount of non-solvent and with a sufficient amount of solvent, preferably methyl or ethyl chloride as a non-solvent and butane or isobutylene as the solvent, to solvate the polymer produced without dissolving it but sufficient to destroy its adhesiveness, then polymerizing the mixture by the addition thereto of a Friedel-Crafts polymerization catalyst, preferably aluminum chloride in solution in a low-freezing, non-complex-forming solvent to produce a solvated, solid polymer in suspension in the adjusted diluent, and thereafter separating the solid polymer and removing the solvating solvent therefrom to yield a solid polymer having a Staudinger molecular weight number above 20,000, preferably within the range between 30,000 and 70,000 with an iodine number preferably within the range between 1 and 10; and reactivity with sulfur or other curing agent to yield a cured material having a tensile strength at break ranging from 1,800 to 4,000 p. s. i. and an elongation at break ranging from 500% to 1200%. Other objects and details of the invention will be apparent from the following description:

The basic procedures of the polymerization reaction are well shown in United States Patents Nos. 2,356,127 and 2,356,128, patented August 22, 1944.

According to the present invention, a mixture is prepared consisting of a major proportion of isobutylene with a minor proportion of a multiolefin; the isobutylene preferably being present in from 70% to 99% ratio and the multiolefin present in from 30% to 1%. For the multiolefin, the preferred substances are butadiene, isoprene, piperylene, dimethallyl, dimethyl butadiene, cyclo pentadiene, myrcene, allo-ocymene, and the like, substantially any organic compound having four to fourteen carbon atoms per molecule and two or more carbon to carbon double linkages in the molecule without regard to substituents in side chains or in the linear backbone chain being useful. That is, such substances as the olefinic ethers, the mixed ethers of olefins and alkyls, and the like, are similarly useable. The mixture is not necessaryily limited to two monomers but may contain three or more monomers which may be chosen from the substances above listed or may be chosen from such other substances as styrene, chloro and bromo styrene, the vinyl naphthalenes and a wide range of other unsaturates containing one or more carbon to carbon double linkages per molecule.

The mixture of isobutylene and multiolefin may be prepared at any convenient temperature, although usually it is preferable first to cool the isobutylene below its boiling point at atmospheric pressure. The polymerization temperature preferably lies below about $-40°$ C. since above that temperature the molecular weight tends to be unduly low; and above $-103°$ C. since temperatures lower than that are expensive and in some instances are unduly low, so that the polymerization reaction does not proceed as vigorously as is desirable. However, with some olefinic mixtures, temperatures as low as $-164°$ C. are useful. The cooling preferably is obtained by a refrigerating jacket upon the reactor, and, if desired, upon the storage and mixing containers. The refrigeration in the refrigerating jacket is conveniently obtained by the use of such substances as liquid propane, liquid sulfur dioxide, liquid or solid carbon dioxide, liquid ethane, liquid ethylene, various of the fluorinated hydrocarbons or even liquid methane. In some instances, an internal refrigerant is conveniently used. Such substances as liquid propane, liquid or solid carbon dioxide, liquid ethane, or liquid ethylene serve efficiently as diluent-refrigerants in the polymerization mixture.

To the polymerization mixture there is also added a substantial amount of non-solvent. The preferred non-solvent is methyl chloride, but alternatively such substances as ethyl chloride, ethylene dichloride, methylene chloride and other mono- or poly- halogen substituted alkyl substances, and the like, are also useful. The amount of non-solvent added is adjusted according to the characteristics of the non-solvent, the reaction temperature and the solvent properties of the other components in the polymerizate mixture to produce a polymerizate material in which the polymer, when produced, is solvated sufficiently to be practically non-sticky, or very slightly sticky, and of a non-cohesive nature; and at the same time sufficient non-solvent is present to prevent the formation of an actual solution of high viscosity.

The mixture as so prepared is polymerized at the desired temperature, which temperature is best set between $-78°$ C. and $-99°$ C.; by the application of the Friedel-Crafts catalyst.

The preferred catalyst is aluminum chloride in solution in a low-freezing, non-complex-forming solvent, the solvent preferably having a freezing point below 0° C., thereby being low-freezing and showing no substantial boiling point, freezing point, or osmotic pressure abnormalities or anomalies from the characteristics of ideal solutions; that is, forming no stable chemical combination between secondary valences in the solvent and secondary valences in the solute; or in terms of the phase rule, the instillation of solvent to, or distillation of solvent from the solute shows substantially smooth temperature curves without appreciable breaks or anomalies. While the preferred catalyst is aluminum chloride, any of the catalysts disclosed by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used. Titanium tetrachloride is found to be almost as satisfactory as aluminum chloride, and boron trifluoride, especially in solution in a low-freezing, non-complex-forming solvent, is just about as good for most of the polymerizations, although in gaseous form it is useless as a polymerization catalyst with solutions containing butadiene because of the fact that it is too severely poisoned by butadiene.

The preferred catalyst solvents, as above pointed out, are ethyl or methyl chloride or carbon disulfide, when aluminum chloride is used. When aluminum bromide or mixed chlorobromides are used, these solvents and also various of the saturated hydrocarbons such as propane, butane, pentane, hexane, and the like, are excellent solvents. These same solvents serve very well when aluminum ethoxy chloride is used, although this material being liquid, can be used directly without solvent. Similarly, the same solvents are satisfactory when boron trifluoride is used, especially with the multiolefins having 5 or more carbon atoms per molecule.

The catalyst may be added to the polymerizate mixture in any desired fashion such as by application in the form of a fine spray onto the surface of the rapidly stirred olefinic mixture or in the form of a fine, high pressure jet into the body of the olefinic material or by other means which will be obvious to those skilled in the art. The polymerization proceeds rapidly and follows closely the rate of addition of catalyst, either in batch operation or in continuous operation. The polymer may be separated from diluent, catalyst solvent and unpolymerized materials by any convenient means, although the preferred method at the present time is to deliver a slurry of polymer in polymerization fluid into a body of warm water which serves to volatilize out unpolymerized olefinic materials, catalyst solvent, diluent, and the like, and yields a slurry of solid polymer in water which may be dried in a tunnel dryer or on a roll mill or on a rotating filter or other means, as desired.

The resulting polymer may have a molecular weight ranging up to 150,000; occasionally as high as 200,000 or 250,000, as determined by the Staudinger method. However, the preferred molecular weight range is between about 35,000 and about 60,000 since above 60,000 to 70,000 the polymer is undesirably tough and hard to process on the mill, and below about 30,000 to 35,000, the tensile strength is undesirably low. The polymer may have an iodine number (as determined by the WIJS method) of from 1 to 40 or 50. However, the preferred iodine number usually lies between about 1 and from 6 to 10. The polymer is reactive with elemental sulfur, especially in the presence of a sulfurization aid such as tetramethyl thiuram disulfide or the like; the polymer is also reactive in a curing reaction with para quinone dioxime and its analogs, homologs, esters and metal salts; and with the dinitroso compounds; all of which yield excellently cured products. The cured polymer shows a tensile strength within the range between 1500 to 1800 and about 4500 pounds per square inch at break; with an elongation at break within the range between about 500% and 1100%, or 1200%. The cured polymer shows a modulus (pounds per square inch pull to stretch the cured polymer by 300%) ranging from 250 up to about 700, depending upon the character and amount of compounding ingredients. The cured polymer is extremely resistant to acid, alkali and solvents generally, except the simple hydrocarbons and the halogenated hydrocarbons. The polymer also shows an excellent resistance to ozone and an adequate resistance to heat and light.

The process of the present invention is particularly valuable because of the facts: first, that a reaction mixture of satisfactory viscosity in the reactor at a desirable polymer concentration is obtained, which is not possible if the polymer is in solution; secondly, the polymer is sufficiently well precipitated under non-sticky conditions to eliminate cohesion of the highly swollen particles to form lumps and to avoid adhesion of the polymer to the reactor walls and the stirrer; thirdly, the reduction in adhesive properties permits a greatly lengthened operating cycle in a continuous polymerizer; fourthly, the resulting polymer at comparable conversion levels shows a higher modulus and cures in a shorter length of time because of the improved polymerization conditions; fifthly, a polymer of a given quality can be made without the extreme care to maintain as low a temperature as possible, which is otherwise necessary, and the presence of "hot spots" in the polymerizate mixture does not cause the serious reduction in quality of polymer which otherwise occurs.

EXAMPLE 1

A feed mixture was prepared consisting of 350 parts by volume of liquid isobutylene having a purity of approximately 99% with 10.5 parts by volume of isoprene having a purity of approximately 96%. This mixture was delivered to a reactor having a refrigerating jacket containing liquid ethylene which cooled the reactor and its contents to a temperature well down to the boiling point of liquid ethylene at −103° C.; the reaction temperature obtained being at or below −95° C. To the mixture in the jacketed reactor there was then added 300 parts by volume of isobutane and 350 parts by volume of methyl chloride. To this mixture at a temperature below −95° C. there was then added a catalyst solution consisting of 0.3% solution of aluminum chloride in methyl chloride; the catalyst being added in the form of a fine high pressure jet at the rate of 28 parts by volume per minute until sufficient catalyst had been added to polymerize approximately 43% of the mixed olefins. The polymer formed as a somewhat viscous, somewhat gelatinous, partially solvated body in the reaction mixture. As a test of the adhesiveness of the polymer, the stirrer was stopped, and the polymerization was allowed to continue under the effect of residual catalyst until a thick layer of gelatinous polymer had accumulated on the walls of the reactor, on the stirrer and at the surface of the cold polymerizate material. The stirrer was then put into operation and the masses of gelatinous polymer broke up promptly into relatively small particles and the reactor walls and stirrer were completely free from adherent polymer.

A series of similar polymerizations was then conducted with different proportions of isobutane and methyl chloride in the mixture to yield the results shown in the subjoined Table I.

In each polymerization shown in this table, the initial mixture consisted of 350 volumes of isobutylene and 10.5 volumes of isoprene, to which there were then added the varying amounts and ratios of diluent, as shown in the first three columns of the table. The fourth and fifth columns of the table show the amount of catalyst and the efficiency of the catalyst, that is, grams of polymer per gram of aluminum chloride. The sixth column shows the percent conversion; the seventh column shows the Mooney plasticity of the polymer obtained. The eighth column shows the amount of carbon black used in the compounding formula; the ninth, tenth and eleventh columns show the tensile strength, modulus, and elongation at break of samples cured, 20, 40 and 60 minutes.

TABLE I
Polymer made in partial solution (a)

| Diluent | | | Catalyst | | Conv. Weight Per Cent | Mooney 5' | Parts Cabot #9 | Tensile—300% Modulus—Elongation; Cured at 307° F. | | |
|---|---|---|---|---|---|---|---|---|---|---|
| MeCl, cc. | i-C$_4$H$_{10}$, cc. | n-C$_4$H$_{10}$, cc. | Conc., g./100 cc. | Eff., g./g. | | | | 20' | 40' | 60' |
| 0 | ² 1,050 | ------ | 0.30 | 490 | 70 | 47 | 50 | 2850—500—850 | 2950—730—710 | 2800—900—620 |
|   |         |        |      |     |    |    | 10 | 2500—190—920 | 2300—250—740 | 1350—290—570 |
| 350 | ³ 700 | ------ | 0.30 | 570 | 43 | 78 | 50 | 3350—610—790 | 3350—830—700 | 3200—940—620 |
|     |       |        |      |     |    |    | 10 | 3400—240—890 | 3000—260—750 | 2600—310—680 |
| 525 | ⁴ 525 | ------ | 0.30 | 730 | 57 | 82 | 50 | 3750—550—840 | 3400—670—740 | 3300—740—670 |
|     |       |        |      |     |    |    | 10 | 3600—220—880 | 3050—280—750 | 1950—320—610 |
| 140 | ⁵ 610 | ------ | 0.30 | 750 | 50 | 92 | 50 | 3350—620—790 | 3400—960—670 | 3250—970—640 |
|     |       |        |      |     |    |    | 10 | 3700—200—950 | 3200—260—790 | 2250—300—610 |
| 1,050 | 0 | ------ | 0.30 | 560 | 64 | 93 | 50 | 3400—510—830 | 3400—750—710 | 2850—840—670 |
|       |   |        |      |     |    |    | 10 | 3950—200—980 | 3650—270—790 | 3200—280—720 |
| 0 | ------ | ⁴ 1,050 | 0.24 | 300 | 53 | ⁶ 37 | 50 | 3250—1020—680 | 3050—1230—580 | 2800—1450—510 |
| 525 | ------ | ³ 525 | 0.24 | 770 | 54 | ⁷ 65 | 50 | 3450—750—770 | 3550—940—690 | 3450—1100—650 |
| 700 | ------ | ³ 350 | 0.24 | 850 | 59 | ⁷ 73 | 50 | 3500—650—880 | 3650—830—730 | 3450—870—720 |
| 1,050 | ------ | 0 | 0.24 | 500 | 87 | ⁷ 62 | 50 | 3550—750—790 | 3700—1010—700 | 3450—1170—590 |

¹ Polymerizations were carried out in a 2.5 l., baffled, ethylene-jacketed reactor on a charge of 220 g. (350 cc.) of isobutylene and 6.6 g. (10.5 cc.) of isoprene. An AlCl$_3$-MeCl catalyst (0.24 g./100 cc.) was added through a jet at 28 cc./min.
² The reaction mixture set up in spite of high agitation.
³ The reaction mixture was a slimy, partial solution.
⁴ A fine slurry was produced initially which became more solvated as catalyst addition was continued.
⁵ The reaction mixture was a viscous solution.
⁶ The final polymer had a Staudinger molecular weight of 35,000.
⁷ The final polymer had a Staudinger molecular weight of 47,000.

The results recorded in Table I show the excellent quality of polymers obtainable by the procedure of the present invention.

EXAMPLE 2

A solution of 60 parts of styrene and 40 parts of isobutylene was diluted with 125 parts of liquid methyl chloride. Liquid ethylene was added until a cloudiness was produced; presumably this was due to the separation of solid styrene. An additional 50 parts of MeCl was added and then liquid ethylene until the solution was saturated with respect to ethylene. At this point, the temperature of the solution was −89° C. A total of 125 parts of AlCl$_3$-MeCl catalyst solution (0.45 g./100 cc.) was added through a jet and at the same time portions of ethylene were added to maintain the reaction temperature at −89° C. The copolymer formed as a highly solvated slurry which was readily handled in the reactor. The yield of product was 93 parts, intrinsic viscosity in toluene=0.90.

By carrying out the copolymerization in pure MeCl (3:1 diluent ratio) the product remained completely in solution during the reaction, and at 100% conversion the reaction mixture was very viscous. The intrinsic viscosity of the product was 0.75. Thus two advantages are gained by operating in a partial solvent rather than in a true solvent; first, the viscosity is reduced and second, a copolymer of higher mol. wt. is obtained.

EXAMPLE 3

Several polymethylpentadienes were made to determine the effect of diluent type on reactor performance and product quality. In each case a solution of 100 parts of 2-methylpentadiene, freshly distilled over sodium, was diluted with 200 parts of diluent (shown below) and treated with an AlCl$_3$-MeCl catalyst solution (0.50 g./100 cc.). The catalyst was added dropwise to the well-agitated mixture maintained at −99° C. by means of external refrigeration.

Thus again the advantages of carrying out polymerizations in a medium which solvates the polymer rather than dissolves it are shown; namely, the viscosity is reduced and the molecular weight of the product is increased. It should be noted that the true slurry type of operation gives an even higher molecular weight, but the reactor is readily fouled.

EXAMPLE 4

The polymerizations shown in Example 1 and Table I were made in individual batches and the characteristics determined therefrom. A second series of polymerizations was made in a continuous overflow type reactor equipped with a refrigerating jacket containing liquid ethylene to yield a polymerization temperature at approximately −95° C. Under steady-state operating conditions, the reaction mixture in the reactor contained 21% of methyl chloride, 13% of solvated polymer, and 66% of the olefinic monomers, the monomers consisting of 97.5% isobutylene and 2.5% isoprene. The overflow was a clear, gelatinous solution of reasonable viscosity and excellent concentration. In this polymerization, the relatively large excess of mixed isobutylene and isoprene serve both as reactant and as solvating solvent. The reactor and stirrer remained free from adherent polymer for a much longer time than was possible when the previously utilized slurry type of operation in which the methyl chloride component of 73% of the mixture, was used. The results of the polymerization are shown in Table III in which run 1 shows the operating conditions utilizing 21% of methyl chloride with 66% of combined diluent monomer; and run 2 shows the characteristics when 73% of methyl chloride is used. The second half of Table III shows the difference in characteristics of the polymer. In this instance, the Staudinger molecular weight number of polymer prepared according to the present invention was somewhat higher; the modulus somewhat lower because of

TABLE II

| Conversion | Diluent type | Character of reaction mix | Condition of reactor | Staudinger M. W. of Prod. |
|---|---|---|---|---|
| 75 | MeCl | Viscous Solution | Clean | 19,000 |
| 80 | MeCl—C$_2$H$_4$(1:2) | Highly solvated Slurry | do | 25,000 |
| 74 | C$_2$H$_4$ | Hard Horny Slurry | Fouled | 30,000 | differences in conversion levels, the tensile strength not significantly different in the carbon black loaded material, and not seriously different with a pure gum recipe; the extrusion rate was slightly lower and the bruise index somewhat better, presumably because of the higher molecular weight.

methyl chloride in the mixture, the remainder being the olefinic polymerizate, yields the best polymer, the cleanest reactor, and the longest run length. When cleaning is necessary the reactor is readily flushed out with a hydrocarbon wash since the polymer is already in a highly solvated state.

TABLE III

*Effect of methyl chloride content on polymerization reaction, continuous overflow operation*

REACTION CONDITIONS

| Run | Run Length, Hours | Feed, MeCl | Composition, Per Cent | | Polymer Prod., Rate | Ethylene, Temp. | Delta, T. | Agitator, R.P.M. | Power Input, Kw. | Final Condition of Reactor |
|---|---|---|---|---|---|---|---|---|---|---|
| | | | Polymer | Monomers | | | | | | |
| | | | | | Lb./hr. | °F. | | | | |
| 1 | 40 | 21 | 13 | 66 | 48 | −150 | 17/50 | 1,150 | 2.6/5.5 | Film—No fouling. |
| 2 | 30 | 73 | 18 | 9 | 46 | −147 | 17/28 | 1,150 | 4.4/6.0 | Film+Mass fouling. |

PRODUCT QUALITY

| Run No. | Mooney, 8' | Staudinger, Mol. Wt. | Tread Modulus (400%), 40' | Tread Tensile 40' | Pure Gum, Tensile 40' | Bruise Index | Extrusion Rate, In./Min. |
|---|---|---|---|---|---|---|---|
| 1 | 46 | 38,000 | 800 | 2,750 | 2,500 | 23 | 49 |
| 2 | 44 | 36,000 | 1,050 | 2,800 | 3,000 | 15 | 55 |

EXAMPLE 5

Another series of polymerizations was made in the continuous overflow reactor using various weight percentages of methyl chloride; each run being continued until the amount of polymer adherent to the inside of the reactor and to the stirrer became so great as to necessitate shutdown for cleaning; that is, sufficient adherent polymer to prevent adequate stirring and adequate circulation in the reactor. The same reactor was used for each polymerization and accordingly the results, while relative, are comparable, and indicate the relative cleanliness of operation of the various mixtures. The results are shown in Table IV.

TABLE IV

Weight percent,
MeCl _____ 5   10   15   20   50   80   85   90
Run length
(hours) _____ 20   30   35   41   8   25   35   50

It may be noted that a feed mixture containing between 15 and 20% of methyl chloride showed an excellent run length; whereas a mixture containing 50% methyl chloride showed a very poor run length. A mixture containing 90% of methyl chloride showed the best run length of all, but this is unsatisfactory because of a serious deterioration of the polymer quality at the high percent conversion of the monomers required in operation of this type, and is useless because of the poor catalyst efficiency, the requirement for the handling of very large quantities of methyl chloride, and the poor polymer quality. Even in this high MeCl content system the polymer has sufficient solubility to cause mass fouling in continuous operation.

The polymer quality with from 15 to 20% of methyl chloride in the feed is very high, and the excellent freedom from fouling and plugging of the reactor as shown by the relatively high run length indicates that the best operating condition lies near to 20% of methyl chloride. Other runs indicate that between 20 and 30 or 35%

It may be noted that material having a satisfactory Mooney viscosity value can be made with this feed mixture using liquid ethane rather than liquid ethylene, the reactor temperature being in the neighborhood of about −83 to −85° C. However, since equipment now in operation is designed for liquid ethylene refrigeration, the tendency of the mixture of the present invention to produce polymer having an undesirably high Staudinger molecular weight number and an undesirably high Mooney viscosity can be overcome by the addition of small amounts of diisobutylene to poison the reactor slightly, amounts of diisobutylene ranging from 0.001% to 1% being suitable, depending upon the purity of the reactants and the efficiency of the particular grade of aluminum chloride used as catalyst.

Thus polymerizations of this type are advantageously carried out in a solvating medium. Here the polymer is swelled in the reaction mixture to an extent that its cohesive and adhesive forces are slight and hence mass fouling is eliminated.

EXAMPLE 6

Not only does the mixture of the present invention yield a very clean reactor and an excellent grade of polymer, but is is capable of increasing the modulus of cured samples much above the modulus otherwise obtainable.

A mixture was prepared consisting of 350 parts by volume of liquid isobutylene and 10.5 parts by volume of liquid isoprene, which mixture was diluted with 600 parts of liquid cyclo hexane and 450 parts of ethyl chloride. This feed was polymerized at −98° C. by the addition to it of approximately 150 parts by volume of an 0.45% solution of aluminum chloride in ethyl chloride, added over a time interval of five minutes. This amount of catalyst polymerized approximately 45% of the olefinic material and the polymer was obtained as a highly solvated, moderately viscous mass. This material was recovered by dumping into warm water to volatilize out the unpolymerized olefins, the methyl chloride and the cyclo hexane, and was then compounded and cured to yield a material which showed an excellent tensile strength of 3100 pounds per square inch, and an elongation of 640% at break, the modulus at 300% elongation being 1450 pounds per square inch. This is a polymer different in order of magnitude from most of the previous samples of polymer produced.

Thus the process of the invention polymerizes an isobutylenic material in the presence of a critical mixture of solvent and non-solvent for the resulting polymer, such that the polymer is solvated to a critical extent sufficient to reduce the cohesiveness and adhesiveness to a minimum and to permit of optimum clearing of the solid polymer from the reactor under conditions of reasonable viscosity.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. A process for copolymerizing a mixture of 70 to 99% isobutylene and 30 to 1.0% of a material chosen from the class consisting of styrene and a multiolefin having more than 1 carbon to carbon double bond linkage per molecule and from 4 to 14 carbon atoms per molecule comprising the steps of polymerizing the mixture at a temperature between −40 and −164° C. in the presence of a dissolved Friedel-Crafts catalyst, a hydrocarbon as solvent for the polymer which solvent is liquid at the reaction temperature and an alkyl halide non-solvent for the polymer which non-solvent is a liquid at the reaction temperature, whereby the solid polymer is sufficiently solvated to permit a ready clearing of the reactor without producing a high viscosity mixture, the said solvent and nonsolvent being mixed in a proportion within the range of equal parts of nonsolvent and solvent to ⅓ solvent and ⅔ nonsolvent, the mixture being present in an amount such as to provide in the polymerization mixture from 15 to 35% of nonsolvent.

2. A process according to claim 1 in which the polymerization is carried to such a conversion level that the unreacted monomers serve as the hydrocarbon solvent.

3. A process for copolymerizing a mixture of 70 to 99% isobutylene and 30 to 1.0% of a material chosen from the class consisting of styrene and a multiolefin having more than 1 carbon to carbon double bond linkage per molecule and from 4 to 14 carbon atoms per molecule comprising the steps of polymerizing the mixture at a temperature between −40 and −164° C. in the presence of a dissolved Friedel-Crafts catalyst, butane as a solvent for the polymer and methyl chloride as a nonsolvent for the polymer, whereby the solid polymer is sufficiently solvated to permit a ready clearing of reactor without producing a high viscosity mixture, the said solvent and nonsolvent being mixed in a proportion within the range of equal parts of nonsolvent and solvent to ⅓ solvent and ⅔ nonsolvent, the mixture being present in an amount such as to provide in the polymerization mixture from 15 to 35% of nonsolvent.

4. A process for copolymerizing a mixture of 70 to 99% isobutylene and 30 to 1.0% of a material chosen from the class consisting of styrene and a multiolefin having more than 1 carbon to carbon double bond linkage per molecule and from 4 to 14 carbon atoms per molecule comprising steps of polymerizing the mixture at a temperature between −40 and −164° C. in the presence of a dissolved Friedel-Crafts catalyst, isobutane as a solvent for the polymer and methyl chloride as a nonsolvent for the polymer, whereby the solid polymer is sufficiently solvated to permit a ready clearing of reactor without providing a high viscosity mixture, the said solvent and nonsolvent being mixed in a proportion within the range of equal parts of nonsolvent and solvent to ⅓ solvent and ⅔ nonsolvent, the mixture being present in an amount such as to provide in the polymerization mixture from 15 to 35% of non-solvent.

5. A process for copolymerizing a mixture of 70 to 99% isobutylene and 30 to 1.0 of a material chosen from the class consisting of styrene and a multiolefin having more than 1 carbon to carbon double linkage per molecule and from 4 to 14 carbon atoms per molecule comprising steps of polymerizing the mixture at a temperature between −40 and −164° C. in the presence of a dissolved Friedel-Crafts catalyst, cyclohexane as a solvent for the polymer and ethyl chloride as a nonsolvent for the polymer, whereby the solid polymer is sufficiently solvated to permit a ready clearing of reactor without providing a high viscosity mixture, the said solvent and nonsolvent being mixed in a proportion within the range of equal parts of nonsolvent and solvent to ⅓ solvent and ⅔ nonsolvent, the mixture being present in an amount such as to provide in the polymerization mixture from 15 to 35% of nonsolvent.

6. A process for copolymerizing a mixture of 96½% isobutylene and 3½% of isoprene comprising the steps of polymerizing the mixture at a temperature within the range between −25 and −103° C. in the presence of aluminum chloride dissolved in methyl chloride, and a solvent-nonsolvent mixture consisting of equal parts of isobutane and methyl chloride, whereby the solid polymer is sufficiently solvated to permit ready clearing of the reactor without producing a high viscosity mixture.

WILLIAM J. SPARKS.
JOHN D. GARBER.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,356,129 | Sparks | Aug. 22, 1944 |